Patented Dec. 22, 1925.

1,566,818

UNITED STATES PATENT OFFICE.

CARNIE B. CARTER AND ALBERT E. COXE, OF PITTSBURGH, PENNSYLVANIA, ASSIGNORS TO S. KARPEN & BROS., OF CHICAGO, ILLINOIS, A CORPORATION OF WEST VIRGINIA.

MANUFACTURE OF ALCOHOLS.

No Drawing. Application filed August 28, 1922. Serial No. 584,843.

*To all whom it may concern:*

Be it known that we, CARNIE B. CARTER and ALBERT E. COXE, citizens of the United States, residing at Pittsburgh, in the county of Allegheny and State of Pennsylvania, have invented a new and useful Improvement in the Manufacture of Alcohols, of which the following is a specification.

The present invention relates particularly to the manufacture of alcohols by the action of a mono-halogenated hydrocarbon on an alkali in comparatively dilute alcoholic solution, the alcohol being of the aliphatic series.

The primary object is to render it possible to produce alcohols synthetically by a direct process from mono-halogenated hydrocarbons of the aliphatic series. Certain of these hydrocarbons can be produced either directly or indirectly from natural gas. Thus, the improved process enables a source of supply to be drawn from in the production of alcohols which has not heretofore been commercially available for such purpose.

The mono-halogenated hydrocarbon may be obtained for example, by chlorinating methane or natural gas. The chlorine used in the chlorination process may be obtained by the electrolysis of sodium chloride.

As an illustration of the improved process of producing alcohol, the following may be given:

Introduce a quantity of methyl chloride and an alkali in a dilute aqueous methyl alcoholic solution into a vessel. A reaction will occur, and this reaction may be expedited by the use of heat. The reaction is preferably effected in a closed vessel, or under conditions which will keep the methyl chloride, or a sufficient percentage of it, in the liquor to effect the desired reaction. The reaction will occur at room temperatures (say about 25° C.). However, if the vessel be heated to 100° C. the reaction will be greatly expedited and will be completed, assuming the use of 15 to 20 per cent alcohol, in about an hour.

The degree of dilution of the liquor with water influences the reaction. The methyl chloride reacts in two different ways, and thereby produces two different products, namely, alcohol and ether. The reaction which produces alcohol is made preponderant, or made to predominate, by increasing the degree of dilution of the alcohol with water. The two reactions which occur in the illustration given, are:

(1) $CH_3Cl + NaOH = NaCl + CH_3OH$
(2) $CH_3Cl + CH_3OH + NaOH =$
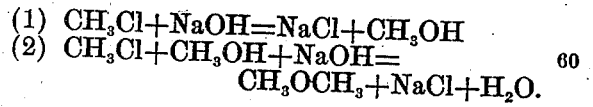
$CH_3OCH_3 + NaCl + H_2O.$ These two reactions take place simultaneously when an aqueous alcoholic solution of an alkali (sodium, potassium and lithium) or alkaline earth (calcium, barium, strontium) hydroxide is treated with methyl chloride, and it is not possible to effect either reaction to the absolute exclusion of the other. However, the relative amounts of methyl alcohol and dimethyl ether resulting from the reaction can be governed within very wide limits. Thus, it is possible to make the bulk of the methyl chloride react in accordance with equation (1), or, on the other hand, the bulk of the chloride may be made to react in accordance with equation (2). The determining factor is the degree of alcoholic concentration; low alcoholic concentration is conducive to the reaction set forth in equation (1), while high alcoholic concentration is conducive to the reaction set forth in equation (2).

This is illustrated by the following experimental results obtained by using calcium hydroxide as the alkali and methyl chloride as the halogenated aliphatic hydrocarbon in aqueous methyl alcoholic solutions of varying alcoholic contents. Column 1 of the table shows the alcoholic content of the solution; column 2, the percentage of alcohol produced from the methyl chloride in accordance with equation (1); and column 3, the percentage of dimethyl ether produced from the methyl chloride in accordance with equation (2):

| Alcoholic concentration. | Methyl chloride. | |
|---|---|---|
| | To alcohol. | To ether. |
| Per cent. | Per cent. | Per cent. |
| 80 | 22.1 | 77.9 |
| 60 | 30.8 | 69.2 |
| 20 | 79.7 | 20.3 |
| 10 | 83.4 | 16.6 |
| 5 | 88.4 | 11.6 |

In practice it is desirable to keep the alcoholic content of the liquor at or somewhat above 5%. In this manner about 90% of the methyl chloride reacting may be saponified directly to methyl alcohol and the remainder to dimethyl ether. The dimethyl ether may be converted, if desired, into alcohol in any suitable manner.

Methyl chloride reacts very rapidly with sodium hydroxide, for example, in a 50% alcoholic solution at ordinary room temperatures; and if the reaction be carried on at a temperature of 100° C., the reaction will be completed within a few minutes. In the case of more dilute alcoholic solutions, however, the reaction takes place less rapidly; and, inasmuch as the present process is concerned with the direct production of alcohol which calls for the use of a dilute alcoholic content in the liquor, it is desirable to use an elevated temperature, which in practice may be 60° C. or higher. The boiling point of water (100° C.) is a very suitable temperature at which to operate the process; and where pressure is employed, this may be simply the counter pressure which is developed in a closed vessel which varies in accordance with the temperature employed in carrying on the reaction.

In commercial practice, it is to be borne in mind that economy of manufacture will require that too great a dilution of the alcohol be not practiced, as the cost of handling and fractionally distilling large volumes of weak liquors in order to recover small volumes of alcohol will militate against economy of operation. For this reason, too weak a solution of alcohol is to be avoided; and, on the other hand, the dilution should be kept sufficiently high to insure a preponderance of the reaction which directly produces alcohol. Unless some other factor enters to influence the course to be followed, it is desirable to use an alcoholic concentration which does not exceed 20% and the most desirable percentage will be somewhere between 5 and 15 per cent of alcohol in the liquor. To quite an extent, this will be governed by the use which can be made of the ether which is produced as a by-product. Thus, should there be a large demand for ether at any time, or should a very economical method of converting the ether into alcohol be or become available, the percentage of ether produced in the process may be allowed to increase to a considerable extent without detriment, and economy would result in the production of the alcohol produced by the direct method herein set forth. There is another factor to be borne in mind, however. The production of dimethyl ether consumes some of the alcohol in the liquor. Accordingly, if the formation of the dimethyl ether becomes too great, the net yield of alcohol is correspondingly reduced.

It may be stated here that in accordance with a published method of converting ether to alcohol, the ether is subjected to the action of an acid catalyst, such as dilute sulphuric acid, heat and pressure being employed to effect the conversion. In practice, it is desirable to employ an alkali in excess of the amount required to react with the halogenated hydrocarbon employed. This excess may be 100% without detriment to the practice of the process.

The following proportions of materials may be stated as an example:

In an autoclave dissolve 150 pounds of sodium hydroxide in 100 gallons of 5 per cent aqueous methyl alcohol solution, add 100 pounds of methyl chloride, and heat until the reaction is complete. At a temperature of 100° C. the reaction will be completed in about one hour. The reactions which occur produce alcohol, ether and sodium chloride. The separation of the materials may be effected in any desired manner, or in the manner hereinafter indicated.

The methyl chloride employed is preferably introduced into the mixture as a liquid, although it may be employed in the form of gas. It is convenient to have a storage tank of methyl chloride, a storage tank of sodium hydroxide in solution, and a storage tank of aqueous methyl alcohol, although the sodium hydroxide may be employed in solid form, if desired. The sources of supply may be connected with a suitable vessel to serve as a saponifier. If one starts with a 5% alcohol content in the saponifier, for example, the process may be carried on until the alcoholic content in the saponifier rises to say 10 or 15 per cent. In the reaction sodium chloride is produced, and this may be withdrawn from the saponifier. The liquor in the saponifier may be withdrawn, after the alcoholic concentration reaches the desired stage, to a storage tank and from there may be taken, as desired, into a fractionating still. From the fractionating still the alcohol distilled off passes to an alcohol storage tank and the ether distilled off passes to an ether storage tank. The fractionating still may be connected with the aqueous methyl alcohol storage tank to replenish the source of supply as may be necessary. The ether storage tank may be connected with a hydrolyzer, which in turn may be connected with a storage tank which receives the hydrolized liquor. From this last mentioned storage tank the hydrolized liquor may pass to a fractionating still which communicates with the methyl alcohol storage tank and also with an aqueous acid storage tank. The aqueous acid storage tank many be connected, in turn, with the hydrolyzer tank. Fresh supplies of the monohalogenated hydrocarbon and of the alcohol may be introduced into the corresponding storage tanks as required. The method here stated provides for a continuous operation of the process. By this process, all of the methyl chloride may be ultimately converted into the methyl alcohol.

It will be readily understood that the character of the alcohol produced will depend upon the materials employed. Thus, the use of methyl chloride leads to the production of methyl alcohol; and the use of ethyl chloride leads to the production of ethyl alcohol; also, the use of propyl chloride leads to the production of propyl alcohol. It is desirable, of course, to carry out the reaction in any selected case in the presence of a comparatively dilute solution of alcohol of the same character as that which is to be produced. Other alcohols may be produced in an analogous manner by using the appropriate mono-halogenated hydrocarbon.

It may be stated that the reaction when carried out with certain combinations of alkyl halides with certain aliphatic alcohols used as solvents may produce a variety of normal and mixed ethers as a by-product.

The temperature at which the reaction may be effected may be any desired temperature, but, as has been indicated, an elevated temperature is preferred, such as a temperature of in the neighborhood of 100° C.

It is desirable to employ the alkyl halides and the alkali in substantially molecular proportions. Any suitable alkali may be employed, that is, while the hydroxide is preferably employed, some other compound may be employed, such as carbonate or bicarbonate of an alkali metal.

Examples of mono-halogenated hydrocarbons of the aliphatic series, or alkyl halides, which may be employed, are as follows:
Methyl chloride ($CH_3Cl$).
Ethyl chloride ($C_2H_5Cl$).
Propyl chloride ($C_3H_7Cl$).
Isobutyl chloride ($C_4H_9Cl$).

Iodides and bromides of the same character, belonging to the mono-halogenated hydrocarbons of the aliphatic series, may be employed in the process.

Examples of alcohols of the aliphatic series which may be employed in the process are as follows:
Methyl alcohol ($CH_3OH$).
Ethyl alcohol ($C_2H_5OH$).
Normal propyl alcohol ($C_3H_7OH$).
Isobutyl alcohol ($C_4H_9OH$).

Examples of alkalies which may be employed in the process are as follows:
Sodium hydroxide (NaOH).
Potassium hydroxide (KOH).
Sodium carbonate ($Na_2CO_3$).
Sodium bicarbonate ($NaHCO_3$).
Potassium carbonate ($K_2CO_3$).
Potassium bicarbonate ($KHCO_3$).
Calcium hydroxide $Ca(OH)_2$.

As has been indicated, methyl chloride may be obtained directly from natural gas or other gas, by a chlorinating process. The same is true of some of the other chlorides, while other mono-halogenated hydrocarbons may be obtained indirectly from gas. Thus, natural gas, or other gas, may be the ultimate source of supply for obtaining any of the desired halogenated hydrocarbons of the aliphatic series for the purpose of producing alcohol in accordance with the present process.

The materials undergoing reaction may be present in varying proportions, inasmuch as, under the conditions set forth, they will unite in proper proportions to form alcohol as the main product and ether as a by-product. The pressure which arises during the reaction in a closed vessel, whether at ordinary room temperatures, or at elevated temperatures, is sufficient to maintain a sufficient amount of the halogenated hydrocarbon in solution to permit the reaction to proceed. At elevated temperature, the reaction is expedited, the pressure being correspondingly increased. Application of pressure from an external source is unnecessary but may be used, if desired. The pressure may vary, depending upon the materials employed, the product produced, and the temperature, from a few pounds to perhaps three or four hundred pounds per square inch. It is to be remarked that the chief function of the alcohol in the carrying out of the process is that of placing the chlorinated product more readily in solution. On the other hand, the use of a large percentage of water and a small percentage of alcohol favors the placing of the alkali in solution as such, rather than the formation of an alcoholate and it is to this feature that the preponderant production of alcohol is to be attributed. On the other hand, the chlorinated hydrocarbon is soluble to a certain degree in water alone, hence, it is perfectly possible to begin the operation of the process in the presence of little or no alcohol; and, as the operation proceeds, the desired degree of concentration of alcohol will be acquired by the liquor. Thereafter, the degree of concentration of alcohol in the liquor may be regulated in accordance with the most economical procedure, alcohol being distilled off from time to time as to best accord with economical operation.

The foregoing detailed description has been given for clearness of understanding only and no necessary limitations should be understood therefrom, but the appended claims should be construed as broadly as permissible in view of the prior art.

What we regard as new, and desire to secure by Letters Patent, is—

The continuous process of producing alcohol which comprises causing a reaction between a mono-halogenated hydrocarbon and an alkali dissolved in water and a small percentage of an alcohol of the aliphatic series, such reaction being effected at a temperature of approximately 100° C., under pressure, and removing alcohol from time to time to maintain a concentration of alcohol which is lower than 20%.

CARNIE B. CARTER.
ALBERT E. COXE.